US012017237B2

(12) United States Patent
Rexach et al.

(10) Patent No.: US 12,017,237 B2
(45) Date of Patent: *Jun. 25, 2024

(54) SHOWERHEAD

(71) Applicant: Kohler Co., Kohler, WI (US)

(72) Inventors: Rafael A. Rexach, Sheboygan, WI (US); Tory L. Hayner, Howards Grove, WI (US)

(73) Assignee: KOHLER CO., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,689

(22) Filed: Dec. 9, 2022

(65) Prior Publication Data

US 2023/0105648 A1 Apr. 6, 2023

Related U.S. Application Data

(63) Continuation of application No. 16/924,562, filed on Jul. 9, 2020, now Pat. No. 11,548,017.

(60) Provisional application No. 62/872,504, filed on Jul. 10, 2019.

(51) Int. Cl.
*B05B 1/20* (2006.01)
*B05B 1/18* (2006.01)

(52) U.S. Cl.
CPC ................ *B05B 1/20* (2013.01); *B05B 1/185* (2013.01)

(58) Field of Classification Search
CPC .. B05B 1/20; B05B 1/185; B05B 1/18; E03C 1/0405; E03C 1/0408; E03C 1/08
See application file for complete search history.

(56) References Cited

U.S. PATENT DOCUMENTS

| | | | |
|---|---|---|---|
| 3,346,148 | A | 10/1967 | Weese |
| 3,739,983 | A | 6/1973 | Jousson |
| 4,337,899 | A | 7/1982 | Selberg |
| 4,765,540 | A | 8/1988 | Yie |
| 5,803,363 | A | 9/1998 | Matsumura et al. |
| 5,918,811 | A | 7/1999 | Denham et al. |
| 6,715,699 | B1 | 4/2004 | Greenberg et al. |
| 7,055,767 | B1 | 6/2006 | Ko |
| 7,070,125 | B2 | 7/2006 | Williams et al. |
| 7,278,591 | B2 | 10/2007 | Clearman et al. |
| 7,322,535 | B2 | 1/2008 | Erdely |
| 7,344,094 | B1 | 3/2008 | Tracy et al. |

(Continued)

FOREIGN PATENT DOCUMENTS

| | | | |
|---|---|---|---|
| CN | 102160765 | A | 8/2011 |
| EP | 2 359 726 | A1 | 8/2011 |

(Continued)

*Primary Examiner* — Qingzhang Zhou
(74) *Attorney, Agent, or Firm* — FOLEY & LARDNER LLP

(57) ABSTRACT

A spray head assembly includes a body and a plurality of nozzles. The body is configured to receive a supply of fluid. The plurality of nozzles are disposed on the body and fluidly connected to the body. The plurality of nozzles are arranged in a substantially linear row having at least three nozzles. The plurality of nozzles are positioned to produce a non-linear spray pattern over a distributed area at a focal length from the body. In some embodiments, each one of the plurality of nozzles directs the fluid in a flow stream to a different location across the distributed area without intersecting the flow stream produced by another one of the plurality of nozzles.

8 Claims, 11 Drawing Sheets

(56) References Cited

U.S. PATENT DOCUMENTS

| | | | |
|---|---|---|---|
| 7,621,286 B2 * | 11/2009 | Frei | B05B 1/20 134/131 |
| 7,770,820 B2 | 8/2010 | Clearman et al. | |
| 7,789,326 B2 | 9/2010 | Luettgen et al. | |
| 7,871,020 B2 | 1/2011 | Nelson et al. | |
| 7,959,088 B2 | 6/2011 | Bolus et al. | |
| 8,016,215 B1 | 9/2011 | Zhadanov et al. | |
| 8,104,697 B2 | 1/2012 | Petrovic | |
| 8,733,675 B2 | 5/2014 | Leber | |
| 8,985,483 B2 | 3/2015 | Petrovic | |
| 9,475,070 B2 | 10/2016 | Akahira et al. | |
| 9,623,423 B2 | 4/2017 | Erickson | |
| 9,657,819 B2 | 5/2017 | Sebert | |
| D802,089 S | 11/2017 | Kiefer | |
| 11,148,165 B2 * | 10/2021 | Fuller | B05B 17/085 |
| 11,235,340 B2 * | 2/2022 | Kiefer | B05B 1/185 |
| 2005/0001072 A1 | 1/2005 | Bolus et al. | |
| 2007/0246577 A1 | 10/2007 | Leber | |
| 2009/0236438 A1 | 9/2009 | Petrovic | |
| 2010/0125946 A1 | 5/2010 | Meisner et al. | |
| 2011/0198415 A1 | 8/2011 | Ukigai et al. | |
| 2011/0198416 A1 | 8/2011 | Ukigai et al. | |
| 2011/0284662 A1 | 11/2011 | Ohashi et al. | |
| 2015/0048184 A1 | 2/2015 | Mccutcheon | |
| 2017/0173601 A1 | 6/2017 | Mazz et al. | |
| 2017/0216855 A1 | 8/2017 | Erickson | |

FOREIGN PATENT DOCUMENTS

| | | |
|---|---|---|
| JP | 4623329 B2 | 2/2011 |
| WO | WO-95/17971 | 7/1995 |

* cited by examiner

SHOWERHEAD

CROSS-REFERENCE TO RELATED PATENT APPLICATIONS

This application is a continuation of U.S. patent application Ser. No. 16/924,562, filed Jul. 9, 2020, which claims the benefit of and priority to U.S. Provisional Application No. 62/872,504, filed Jul. 10, 2019, both of which are hereby incorporated by reference herein in their entirety.

BACKGROUND

The present disclosure relates generally to the field of spray head assemblies for use in bath and shower applications. More specifically, the present disclosure relates to systems for directing the spray of fluid (e.g., water) exiting the spray head assemblies.

SUMMARY

One exemplary embodiment relates to a spray head assembly. The spray head assembly includes a body configured to receive a supply of fluid and a plurality of nozzles. The nozzles are disposed on the body and are fluidly coupled to the body. The nozzles are arranged in a substantially linear row having at least three nozzles. The nozzles are configured to produce a non-linear spray pattern over a distributed area at a focal length from the body.

Another exemplary embodiment relates to a spray head assembly. The spray head assembly includes a body configured to receive a supply of fluid and a plurality of nozzles. The plurality of nozzles are disposed on the body and are fluidly connected to the body. The nozzles are positioned in a substantially linear arrangement across the body. Each one of the plurality of nozzles is oriented in a different direction to provide a two-dimensional spray pattern Yet another exemplary embodiment relates to a showerhead. The showerhead includes a fluid connecting member and a spray head assembly. The spray head assembly includes a flow distribution manifold and a plurality of nozzles. The flow distribution manifold is fluidly connected to the fluid connecting member. The nozzles are disposed on the flow distribution manifold and are fluidly connected to the flow distribution manifold. The nozzles are arranged in a row having at least three nozzles arranged substantially linearly across the flow distribution manifold. The nozzles are configured to produce a non-linear spray pattern over a distributed area at a focal length from the flow distribution manifold.

DETAILED DESCRIPTION

Existing spray head assemblies receive water from a conduit connected to a building water supply line. The spray head assembly may be fixed in position within the bath or shower enclosure and/or connected by a flexible conduit to the water supply line (e.g., a spray head assembly for a handshower) to direct the flow of water to different areas within a bath or shower enclosure. The spray head assembly may include multiple nozzles that direct the flow of water into the bath or shower enclosure. The shape of the spray pattern produced by the nozzles may be the same as the shape formed by the arrangement of nozzles on the spray head. For example, a circular arrangement of nozzles on the spray head will generally produce a circular spray pattern shape. Among other benefits, distributing the water from the spray head in two dimensions over a distributed area (such as a circle) can improve a user's overall bathing experience (e.g., by improving water coverage to different parts of a user's body). However, the nozzle arrangements required to achieve two dimensional spray pattern shapes generally require space within the shower enclosure and are difficult to conceal from the user.

It would be advantageous to provide an improved spray head assembly for producing two-dimensional spray patterns over a distributed area that addresses the aforementioned issues.

Referring generally to the figures, a spray head assembly for use in a bath or shower enclosure is shown, according to various exemplary embodiments. The spray head assembly is configured to direct a fluid flow or a supply of fluid (e.g., water) into the bath or shower enclosure. The spray head assembly includes a base and a plurality of nozzles arranged in a row along a surface of the base. The row includes at least three nozzles arranged linearly (e.g., in a straight line) across the surface. Among other benefits, the linear arrangement of nozzles allows the spray head to be inconspicuously positioned along an upper corner region of the shower enclosure and concealed from a user's view. Each one of the nozzles is oriented in a different direction (e.g., the nozzles have non-parallel central axes) to produce a non-linear spray pattern shape over a two-dimensional distributed area within the bath or shower enclosure. For example, the nozzles may be oriented to produce a circular spray pattern shape, a rectangular spray pattern shape, or any other suitable spray pattern shape (e.g., triangular, elliptical, etc.). The non-linear spray pattern shape may advantageously distribute the supply (e.g., stream) of water more uniformly over a region of space occupied by the user within the bath or shower enclosure as compared to a linear or one dimensional spray pattern shape. These and other advantageous features with become apparent to those reviewing the present disclosure and figures.

Figure 1:
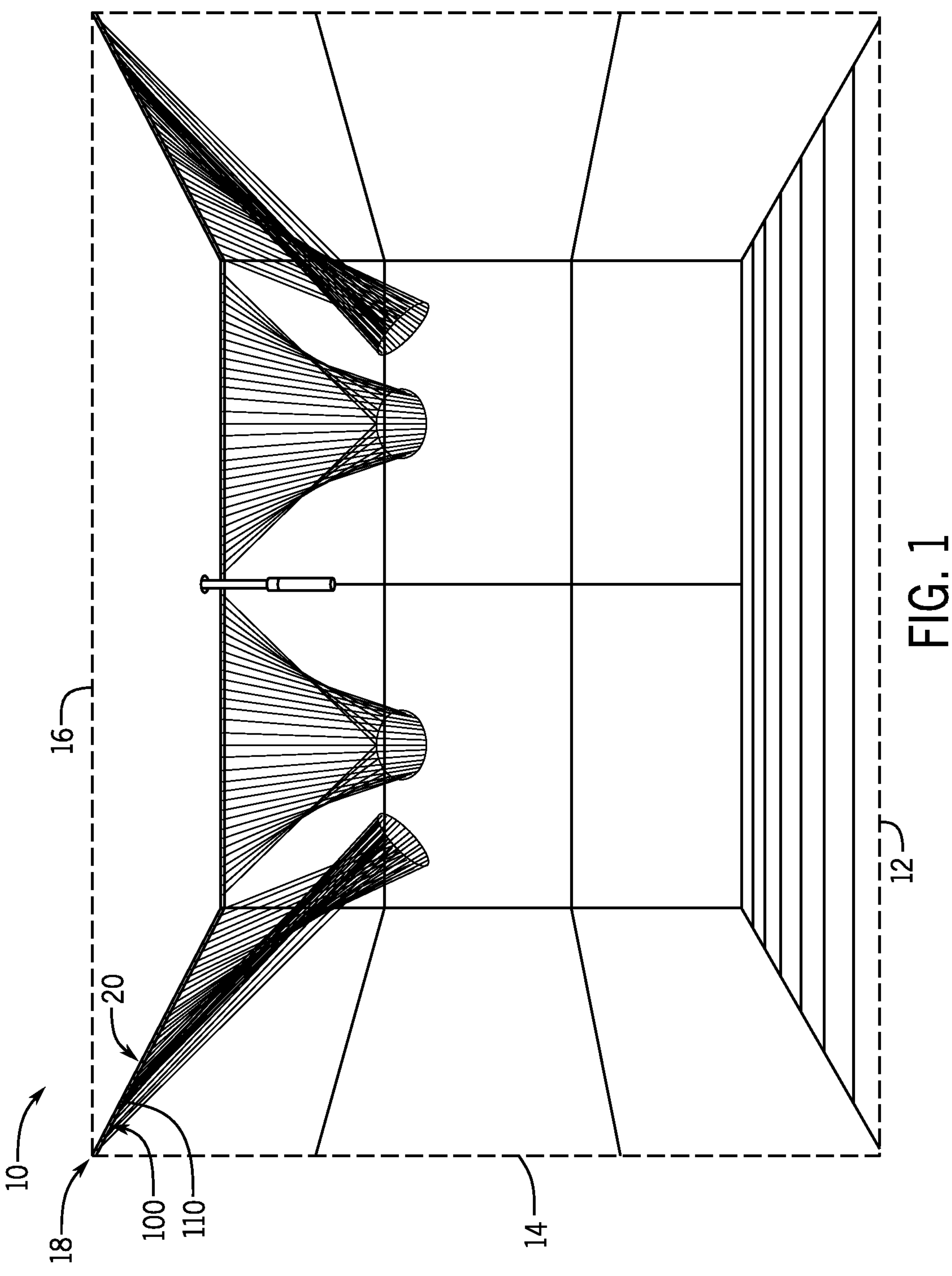
FIG. 1 is a perspective view of a shower enclosure including a spray head assembly according to an exemplary embodiment.

Referring to FIG. 1, a shower enclosure 10 is shown according to an exemplary embodiment. The shower enclosure 10 includes a floor 12, side walls 14, and a ceiling 16, which together define an enclosed space. The shower enclosure 10 includes a showerhead 20 that is configured to provide a spray of water to cover a user and facilitate cleaning operations for personal hygiene. Water provided to the user from the showerhead 20 is removed from the shower enclosure 10 through a drain (not shown) in the floor 12. As shown in FIG. 1, the shower enclosure 10 includes a plurality of showerheads 20 that are located along a perimeter of the shower enclosure 10 to provide water coverage to different sides of the user's body.

Each one of the plurality of showerheads 20 includes a spray head assembly 100 that is inconspicuously positioned within the shower enclosure 10 to help conceal the spray head assembly 100 from the user's view. As shown in FIG. 1, each one of the spray head assemblies 100 is disposed in an upper corner region 18 of the shower enclosure 10, along an intersection between one of the side walls 14 and the ceiling 16. A forward surface 110 of each one of the spray head assemblies 100 is approximately flush with the side wall 14, which maximizes the usable space within the shower enclosure 10. In other embodiments, the forward surface 110 may be approximately flush with the ceiling 16 or another surface of the shower enclosure 10. The location of the spray head assemblies 100 within the shower enclosure 10 also eliminates dead space (locations within the shower enclosure 10 where no water can be provided) that would otherwise exist between each one of the spray head assemblies 100 and the side walls 14 and/or ceiling 16.

FIGS. 2-6 show one of the spray head assemblies 100 in isolation from the shower enclosure 10 of FIG. 1. The spray head assembly 100 includes a body 102 (e.g., housing, casing) including an inlet opening 104 (e.g., a threaded inlet opening) that is configured to receive a supply of fluid (e.g., water), such as through a conduit. For example, the inlet opening 102 of the body 102 may be connected to a household or commercial water supply line (not shown). The body 102 includes a fluid connecting member 106 (e.g., tube, conduit, etc.) and a flow distribution manifold 108. The fluid connecting member 106 may include the inlet opening and may be engageable with a water supply conduit. The fluid connecting member 106 extends from the inlet opening 104 in a direction toward the flow distribution manifold 108 and delivers water from the inlet opening 104 to the flow distribution manifold 108. As shown in FIG. 1, the spray head assembly 100 forms part of a fixed showerhead 20 that is at least partially integrally formed into the walls of the shower enclosure 10. However, it should be noted that the spray head assemblies disclosed herein may also be used in other types of showerheads (e.g., handshowers that are fluidly coupled to an inlet water supply line by a flexible conduit, etc.) and the examples disclosed herein are not meant as limitations.

Figure 2:
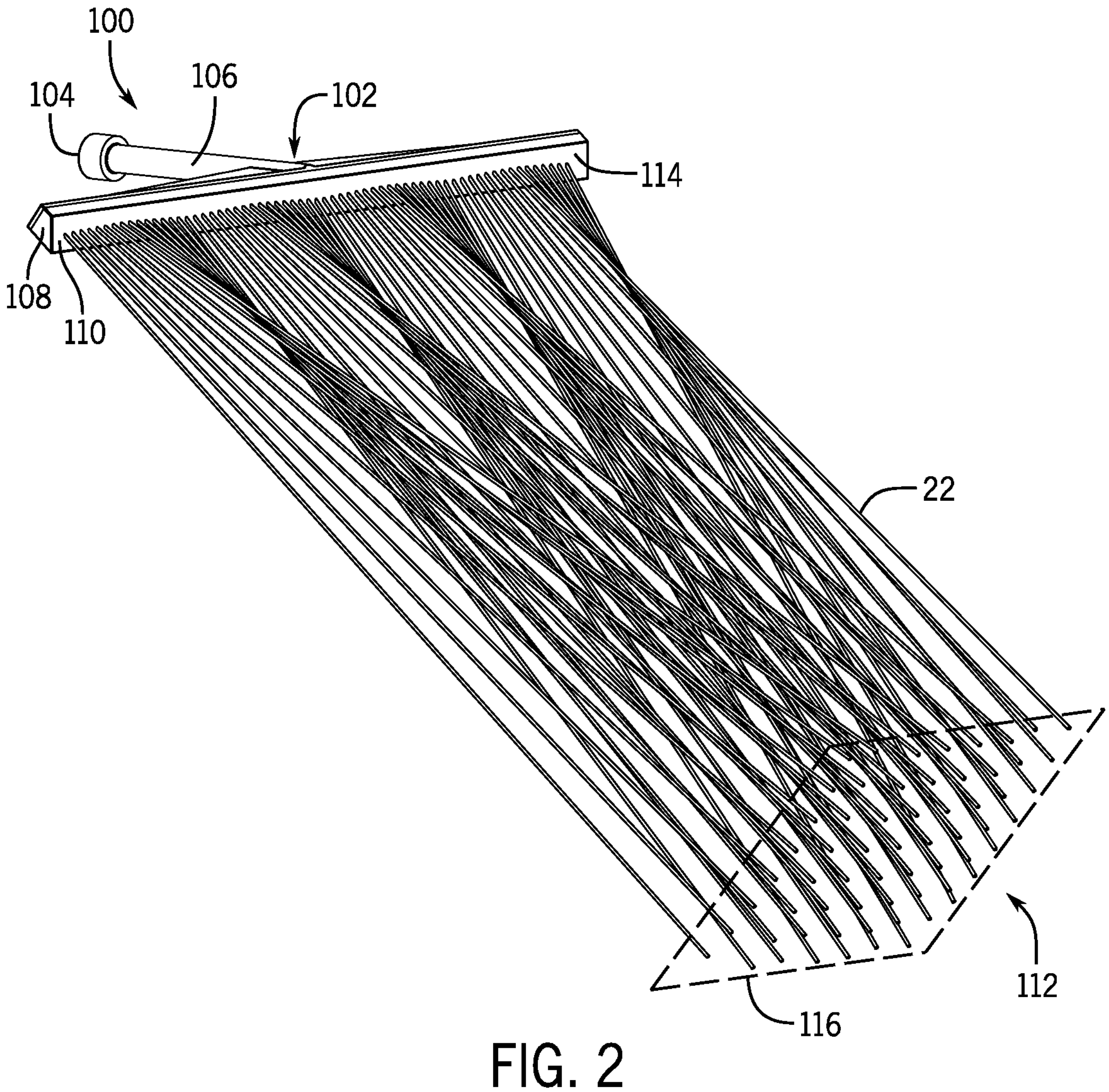
FIG. 2 is a perspective view of a spray head assembly for a bath or shower enclosure, according to an exemplary embodiment.

As shown in FIG. 2, a forward surface 110 (e.g., a face, a face member, an outer discharge plate, etc.) of the body 102 is configured to discharge water in a spray pattern 112 having a predefined spray pattern shape. In various exemplary embodiments, the forward surface 110 includes a plurality of nozzles 114 arranged in a single row across the forward surface 110. In the exemplary embodiment of FIGS. 1-6, each one of the plurality of nozzles 114 is spaced apart from the forward surface 110 and is disposed at least partially within the body 102 (e.g., recessed into the body 102). The nozzles 114 are arranged approximately linearly, in a straight line across the spray head 100. Each of the plurality of nozzles 114 is configured to discharge a corresponding fluid stream 22, where the plurality of fluid streams 22 together form the spray pattern 112. In the exemplary embodiment of FIGS. 1-6, each one of the plurality of nozzles 114 is oriented in a different direction such that the nozzles 114 produce a spray pattern 112 in the shape of a square over a two-dimensional distributed area 116 (e.g., two-dimensional region) at a location where a user would be positioned within the shower enclosure 10 (see also FIG. 1). Stated another way, although the nozzles 112 are provided in a relatively linear arrangement, the spray pattern at the location of the user will have a different shape, shown in FIG. 2 as a "square" arrangement of streams. According to other exemplary embodiments, the pattern may vary, as described below.

Figure 3:
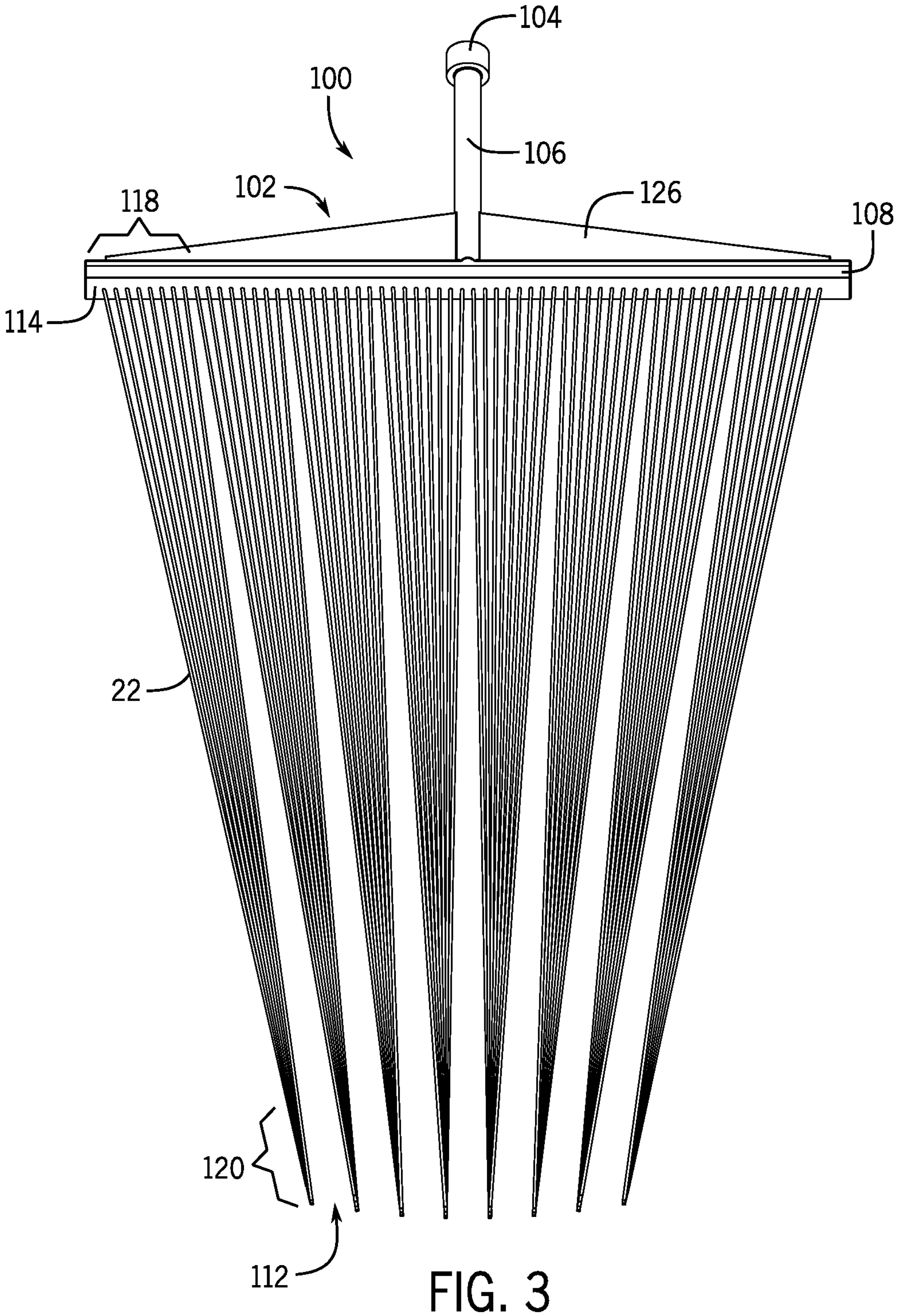
FIG. 3 is a top view of the spray head assembly of FIG. 2.

Each one of the plurality of nozzles 114 is configured to direct water in a flow stream to a different location across the distributed area 116 without intersecting the flow stream (e.g., jet) produced by another one of the nozzles 114. As shown in FIG. 3, the plurality of nozzles 114 is subdivided into a plurality of nozzle subsets 118, each configured to produce a substantially vertical column (e.g., array) of jets (e.g., fluid streams 22) that define one portion of the spray pattern 112 (e.g., a left or right edge of a square, etc.). In other words, each subset 118 is configured to produce a substantially vertical column of water jets 120 from a horizontal row of nozzles 114. In other embodiments, the number of subsets 118 and the position of the nozzles 114 within each subset 118 may differ.

Figure 4:
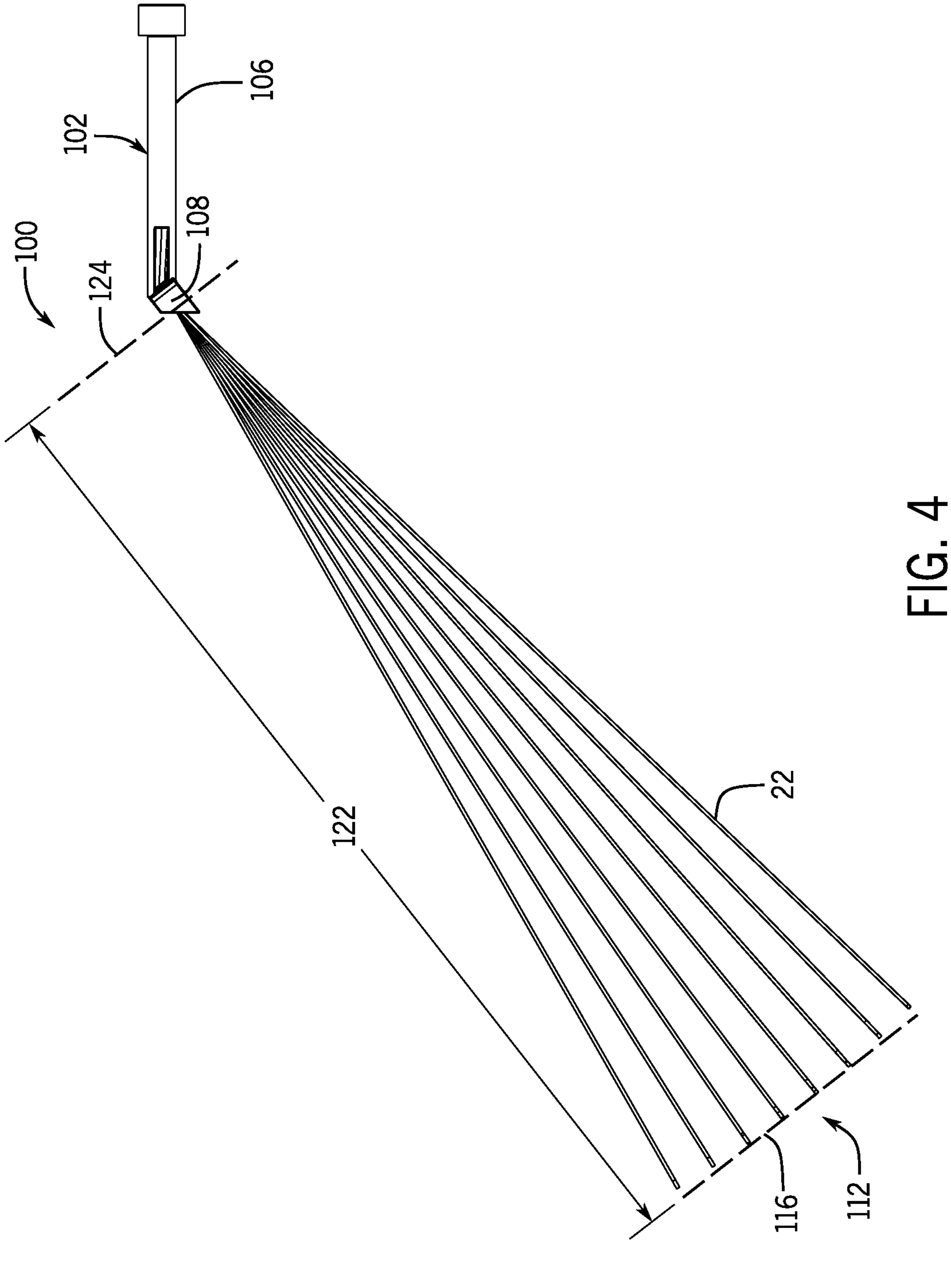
FIG. 4 is a side view of the spray head assembly of FIG. 2.

As shown in FIG. 4, the spray head assembly 100 is configured to produce the spray pattern 112 over a distributed area 116 at a location where a user would be located within the shower enclosure 10 (see also FIG. 1). The distributed area 116 is spaced a distance apart from the body 102 at a focal length 122 (e.g., focal distance) from a nozzle surface of the body 102 to which the nozzles 114 are coupled. The focal length 122 may be measured along a distance from nozzle surface in a direction that is substantially perpendicular to a reference plane 124 passing through (and that is parallel to) the nozzle surface (see also FIG. 5). As shown in FIGS. 2-4, the fluid streams 22 from the plurality of nozzles 114 are spaced at approximately equal intervals across the distributed area 116. In other embodiments, the relative spacing between fluid streams 22 across the distributed area 116 may be different.

Figure 5:
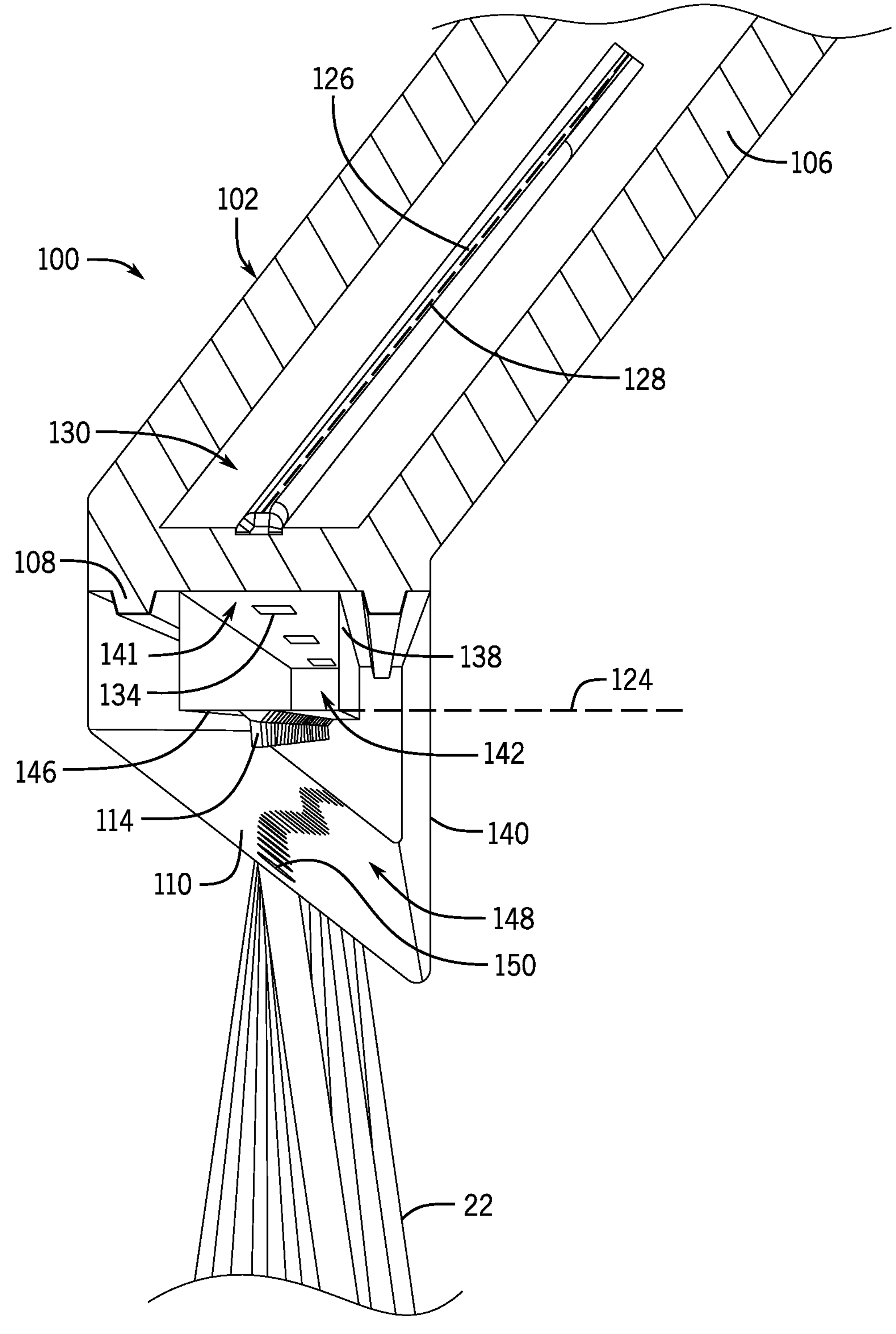
FIG. 5 is a side cross-sectional view of the spray head assembly of FIG. 2.

The flow distribution manifold 108 is configured to substantially uniformly distribute water from the fluid connecting member 106 to each one of the plurality of nozzles 114. FIG. 5 shows a side cross-sectional view of the flow distribution manifold 108. The fluid connecting member 106 is a cylindrically-shaped fluid passageway that extends between the inlet opening 104 and the flow distribution manifold 108. Water is delivered by the fluid connecting member 106 to a plurality of lateral channels 126 that extend outwardly (e.g., away) from the fluid connecting member 106 in a substantially perpendicular orientation relative to a central axis 128 of the fluid connecting member 106 (e.g., radially, etc.). As shown in FIG. 5, the lateral channels 126 are fluidly coupled to the fluid connecting member 106 proximate to where the fluid connecting member 106 engages with the flow distribution manifold 108 (e.g., where the fluid connecting member 106 engages with an upper surface 130 of the flow distribution manifold 108, a distal end of the fluid connecting member 106, etc.).

Figure 6:
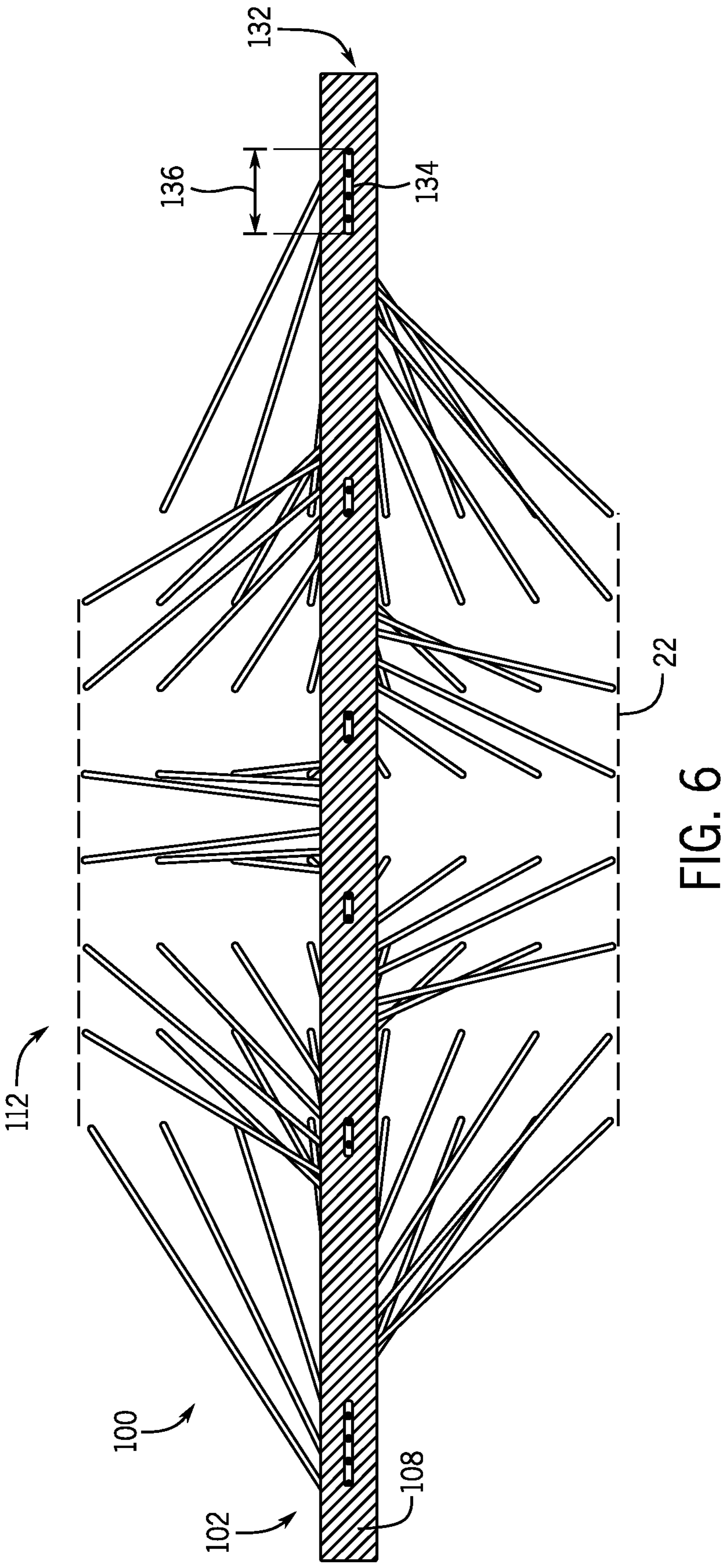
FIG. 6 is a plan cross-sectional view of the spray head assembly of FIG. 2.

Each one of the lateral channels 126 extends outwardly from the fluid connecting member 106 towards an outer end 132 of the flow distribution manifold 108 (see also FIG. 3). FIG. 6 shows a plan cross-sectional view of the flow distribution manifold 108 near a lower end of the lateral channels 126 (e.g., where the lateral channels 126 meet with the flow distribution manifold 108, parallel to the upper surface 130 of the flow distribution manifold 108). The flow distribution manifold 108 includes a plurality of openings 134 distributed along a length of the flow distribution manifold 108 (e.g., a horizontal length from left to right as shown in FIG. 6). The openings 134 are dimensioned to ensure that the flow is distributed equally along the length of the flow distribution manifold 108 (e.g., to nozzles 114). A size of each one of the plurality of openings 134 increases with increasing distance between the opening 134 and the fluid connecting member 106. Specifically, as shown in FIG. 6, a length 136 of each one of the plurality of openings, in a lateral direction (e.g., horizontal direction, etc.), increases with distance from the fluid connecting member 106. The number, size, and arrangement of openings 134 may be different in various exemplary embodiments.

As shown in FIG. 5, the body 102 further includes an inner housing 138 and an outer housing 140 that substantially surrounds the inner housing 138 (e.g., that surrounds the inner housing 138 on at least three sides). The inner housing 138 is coupled to a distal end surface 141 of the flow distribution manifold 108, and is disposed at a central position beneath the openings 134. Together, the inner housing 138 and the distal end surface 141 of the flow distribution manifold 108 define a rectangular-shaped channel 142 configured to receive flow from the openings 134. Flow received within the channel 142 is distributed to the plurality of nozzles 114, which are coupled to a lower surface 146 (e.g., face plate, etc.) of the inner housing 138 at a central position along the lower surface 146. The nozzles 114 are spaced at approximately equal intervals along the lower surface 146 of the inner housing 138 between opposing ends of the body 102. The nozzles 114 are arranged in a row along the lower surface 146. The row includes at least three nozzles 114 arranged substantially linearly (e.g., in a straight line) across the lower surface 146. As shown in FIGS. 5-6, each of the nozzles 114 is oriented in a different direction. In other words, a central axis through any one of the plurality of nozzles 114 is non-parallel to a central axis through any of the remaining nozzles 114 (e.g., the central axis of each of the plurality of nozzles are angled, tilted, and/or slanted relative to one another). It should be noted that an angle formed between the central axis of each nozzle 114 and a reference line extending normal to the lower surface 146 may be different in various exemplary embodiments to tailor the shape of the spray pattern 112, depending on the spray pattern 112 desired.

The outer housing 140 is spaced apart from the inner housing 138 to form a cavity 148 (e.g., a hollow region, etc.) therebetween. In other embodiments, the inner housing 138 may contact at least one side of the outer housing 140. A lower surface of the outer housing 140 forms the forward surface 110 of the body 102. According to various exemplary embodiments, the forward surface 110 is configured to be substantially flush with a shower wall (e.g., a side wall 14 as shown in FIG. 1), which, advantageously, helps to conceal the spray head assembly 100 from a user. As shown in FIG. 5, flow leaving the nozzles 114 passes through the cavity 148 and out through a plurality of apertures 150 that are disposed in the forward surface 110 and are defined by the forward surface. Each one of the plurality of apertures 150 is positioned along a discharge path of a corresponding one of the fluid streams 22 that are produced by the nozzles 114. As shown in FIG. 5, the plurality of apertures 150 forms a zig-zag pattern along the length of the forward surface 110. In other embodiments, and with different spray pattern shapes, the distribution of apertures 150 in the forward surface 110 may be different. Among other benefits, arranging the nozzles 114 within the body 102 (within the cavity 148), rather than on an exposed outer surface of the body 102, conceals the nozzles 114 from a user's view, thereby improving the overall aesthetic of the shower enclosure.

As shown in FIG. 5, the fluid connecting member 106, the lateral channels 126, the flow distribution manifold 108, the inner housing 138, and the outer housing 140 are formed into a single unitary body. In some embodiments, the different components of the spray head assembly 100 may be formed separately from one another and then welded, bolted, or otherwise coupled together. The spray head assembly 100 may be made from multiple pieces of aluminum, stainless steel, or another material with suitable corrosion resistance. It should be appreciated that alternative constructions may be used without departing from the inventive concepts disclosed herein. For example, the body 102 may include a forward surface 110 that is detachably coupled (e.g., removably coupled) to the flow distribution manifold 108 to provide access to the nozzles 114 during maintenance events. In some embodiments, the inner housing 138 and the outer housing 140 may also be removably coupled to the flow distribution manifold 108 to allow a user to access blocked nozzles 114 for repair and/or to interchange nozzles 114 to modify the spray pattern 112 produced by the spray head 100.

Figure 7:
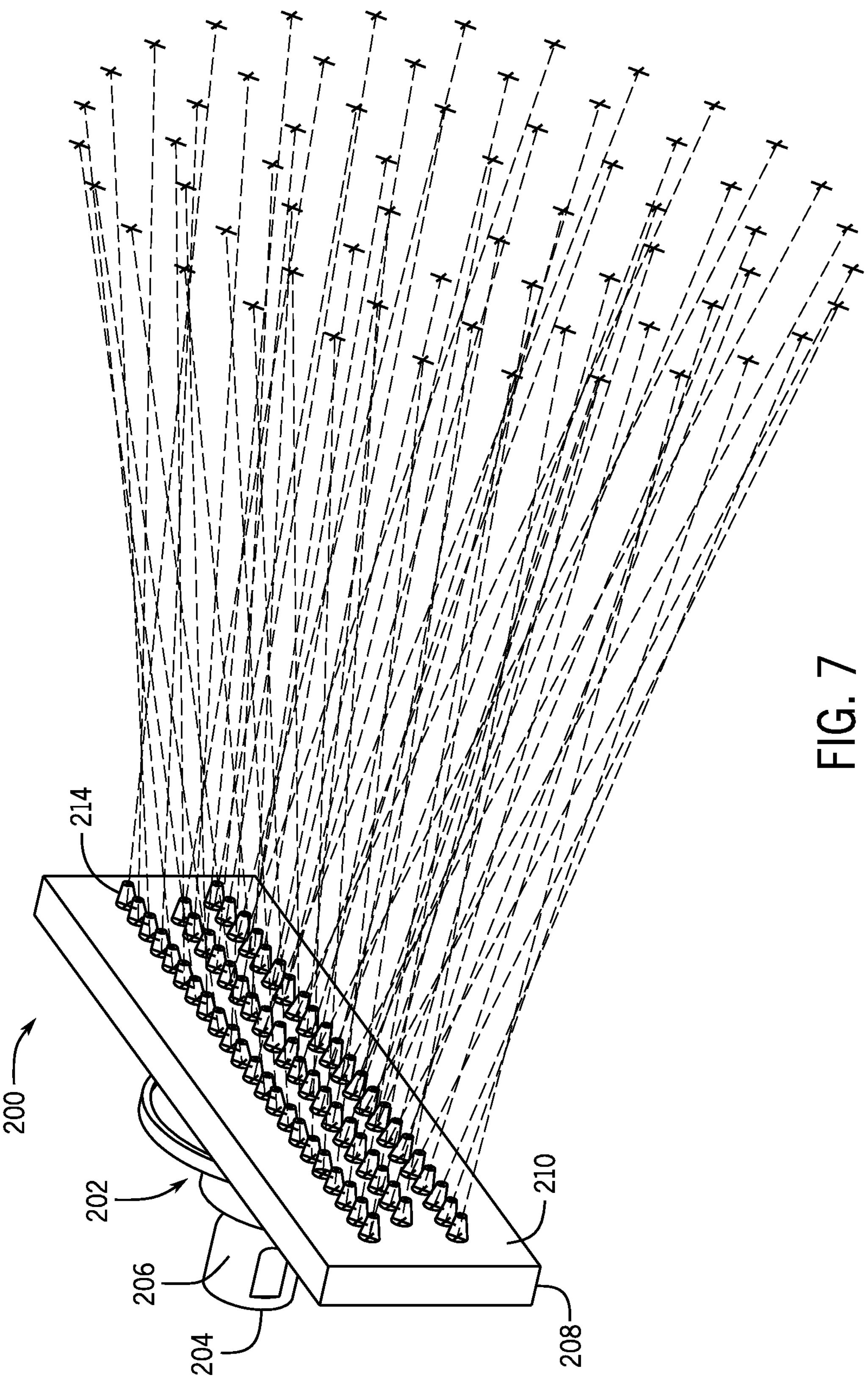
FIG. 7 is a perspective view of a linear-to-circular spray head assembly for a bath or shower enclosure, according to another exemplary embodiment.
Figure 8:
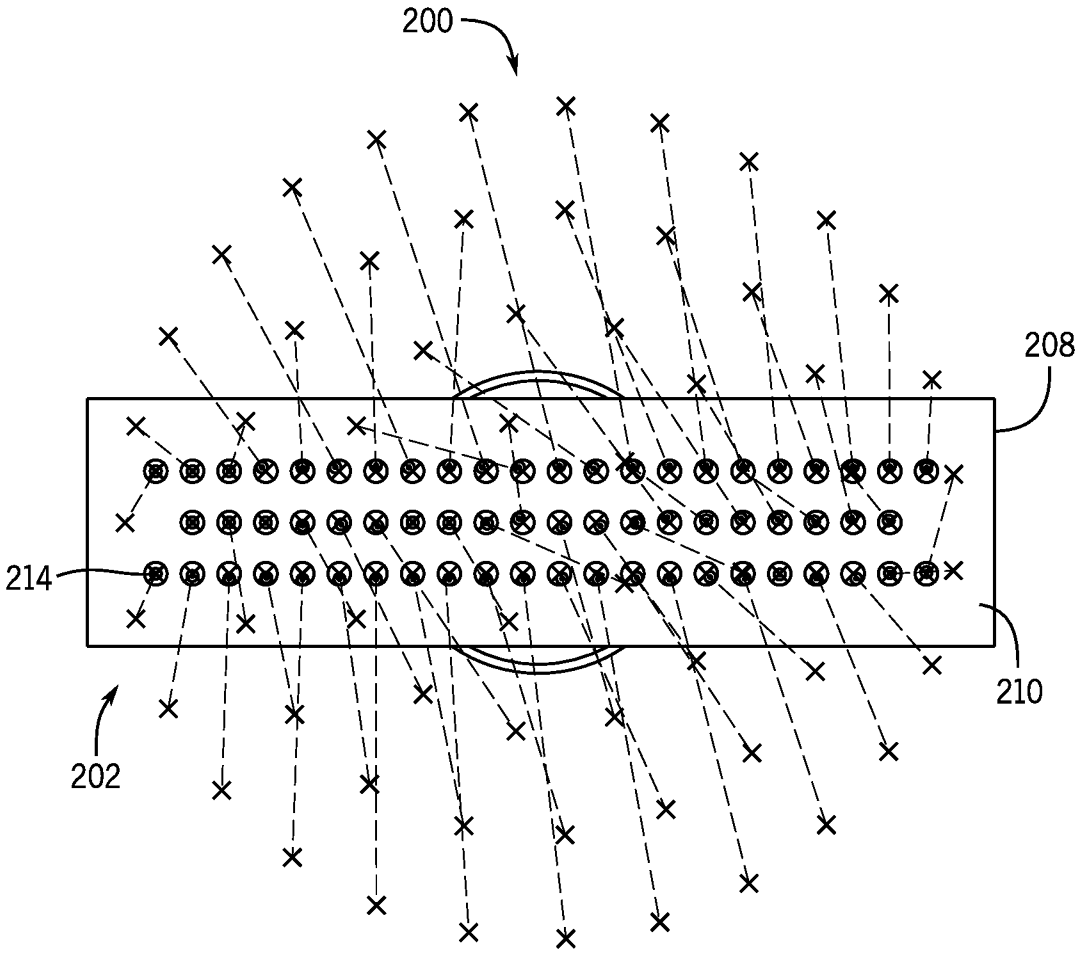
FIG. 8 is a plan view of the spray head assembly of FIG. 7.

The geometry and construction of the spray head assembly 100 described with reference to FIGS. 1-6 should not be considered limiting. Many alternatives are possible without departing from the inventive concepts disclosed herein. For example, FIGS. 7-8 show an exemplary embodiment of a spray head assembly 200 that is configured to produce a circular spray pattern shape from a linear arrangement of nozzles 214 (e.g., a linear-to-circular spray head assembly configuration). The spray head assembly 200 includes a body 202 having an inlet opening 204 configured to receive a supply of fluid. Fluid entering the inlet opening 204 is directed through a fluid connecting member 206 and into a flow distribution manifold 208. As shown in FIGS. 7-8, the plurality of nozzles 214 is coupled to a forward surface 210 of the body 202. The nozzles 214 are arranged in a plurality of rows. Each row includes at least three nozzles 214 arranged linearly (e.g., in a straight line) across the forward surface 210. As shown in FIG. 8, the rows are spaced in a vertical direction (e.g., up and down) in approximately equal intervals across the forward surface 210. Among other benefits, using multiple rows of nozzles 214 reduces the overall length (e.g., right to left as shown in FIG. 8) of the body 202 that is required to produce a desired spray pattern shape for a predefined flow rate. The number of rows and the number of nozzles 214 within each row may be different in various exemplary embodiments. The number of nozzles 214 may also vary between different rows. In the exemplary embodiment of FIGS. 7-8, an upper row and a lower row each include 22 nozzles 214, while a center row, between the upper row and the lower row, includes only 20 nozzles 214.

Figure 9:
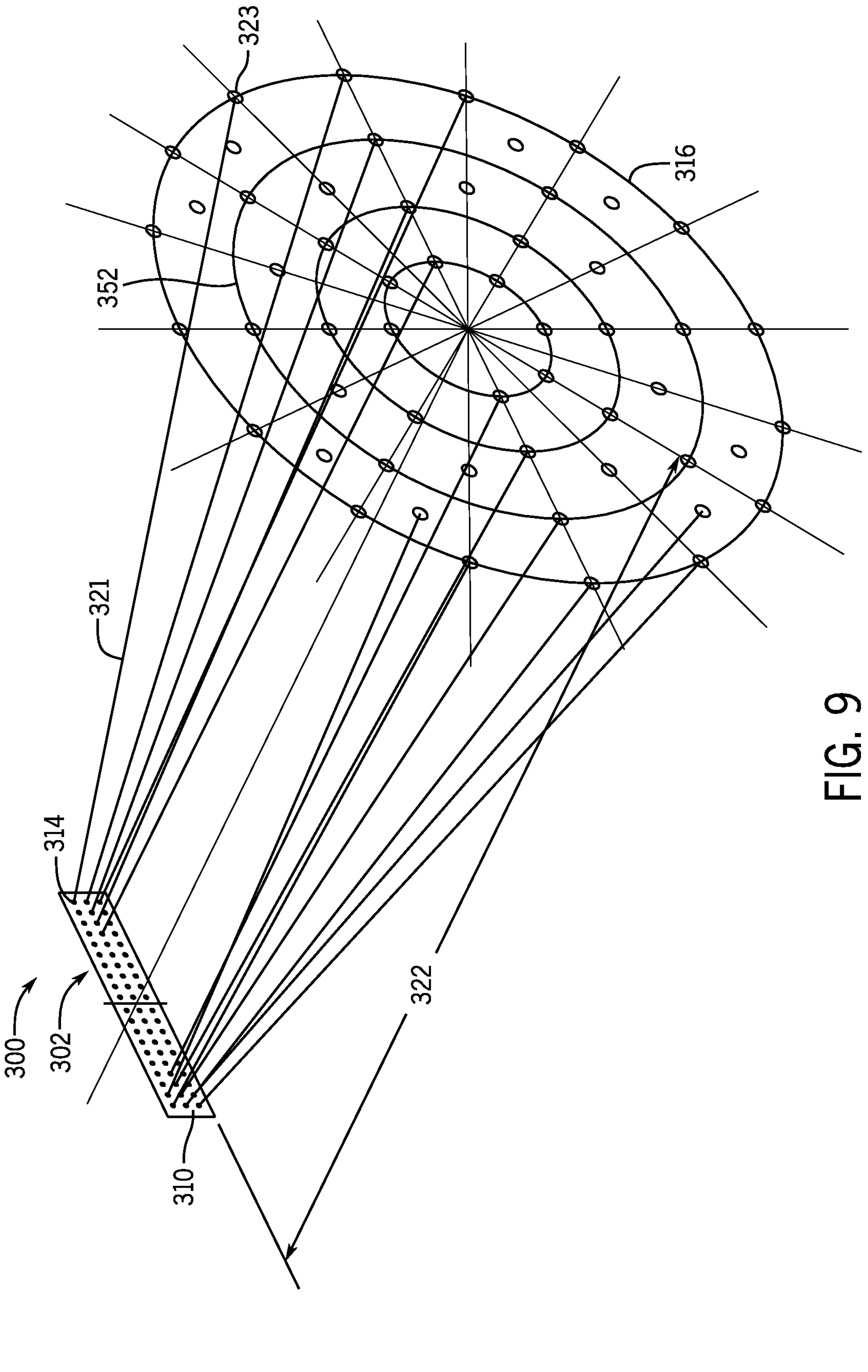
FIG. 9 is a perspective view of a linear-to-circular spray head assembly for a bath or shower enclosure, according to another exemplary embodiment.

FIG. 9 shows another exemplary embodiment of a spray head assembly 300. Similar to the spray head assembly 200 of FIGS. 7-8, the spray head assembly 300 of FIG. 9 is shown to produce a circular spray pattern shape over a distributed area 316 at a focal length 322 from the forward surface 310 of the body 302. The focal length 322 may depend, among other factors, on a height of the shower enclosure and an average user height. However, it should be noted that the focal length 322 of the distributed area 316 may be any distance or length, and the focal length 322 may be varied, such as to cooperate with various examples of spray head assemblies for a showerhead, and the lengths disclosed herein are not meant to be limitations. In the exemplary embodiment of FIG. 9, the focal length 322 (e.g., the length over which the flow transitions from a linear pattern shape to a non-linear pattern shape) is approximately 18 in. The spacing between adjacent fluid streams 321, and correspondingly, the overall size of the distributed area 316 may also be different in various exemplary embodiments. In the exemplary embodiment of FIG. 9, the fluid streams 321 form a plurality of concentrically arranged rings 352 spaced approximately 2 in. apart (e.g., in a radial direction relative to a central axis through the spray pattern). A diameter of the outermost ring of the plurality of rings 352 is approximately 8 in.

The points 323 (e.g., dots) on the distributed area 316 shown in FIG. 9 are meant to illustrate the specific locations where the plurality of fluid streams 321 produced by the plurality of nozzles 314 pass through the distributed area 316. As shown in FIG. 9, each fluid stream 321 is configured to pass between the spray head assembly 100 and the distributed area 316 without intersecting any other fluid stream 321 (e.g., a route traversed by each individual fluid stream 321 is unique from the other fluid streams 321). Among other benefits, preventing the fluid streams 321 from intersecting across the distributed area 316 (and/or between the spray head assembly 100 and the distributed area 316) reduces excessive splashing and ensure that a coherent flow structure is maintained within the distributed area 316.

Figure 10:
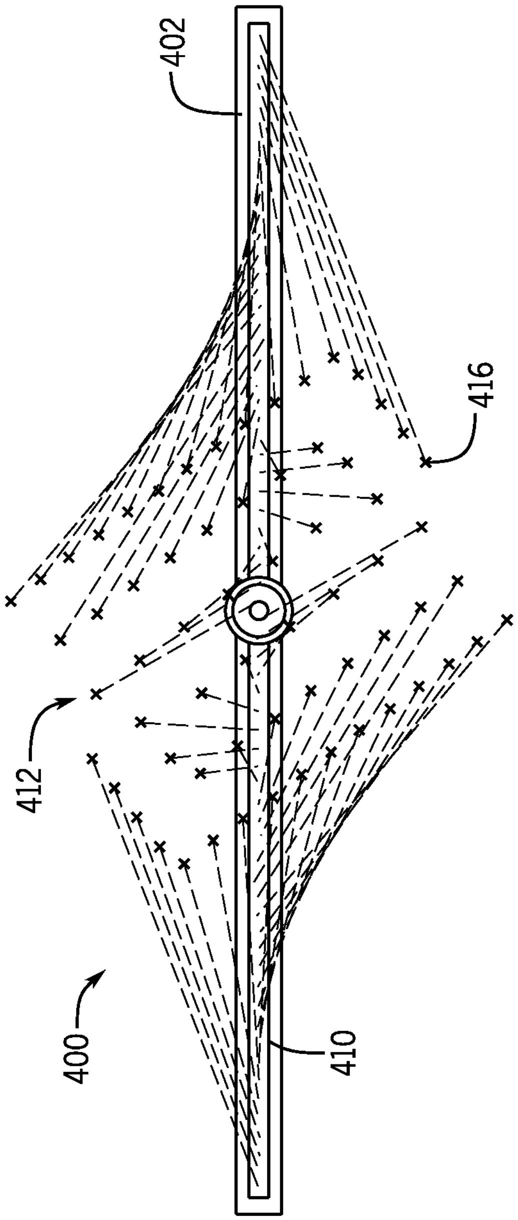
FIG. 10 is a plan view of a spray pattern shape for a spray head assembly, according to an exemplary embodiment.
Figure 11:
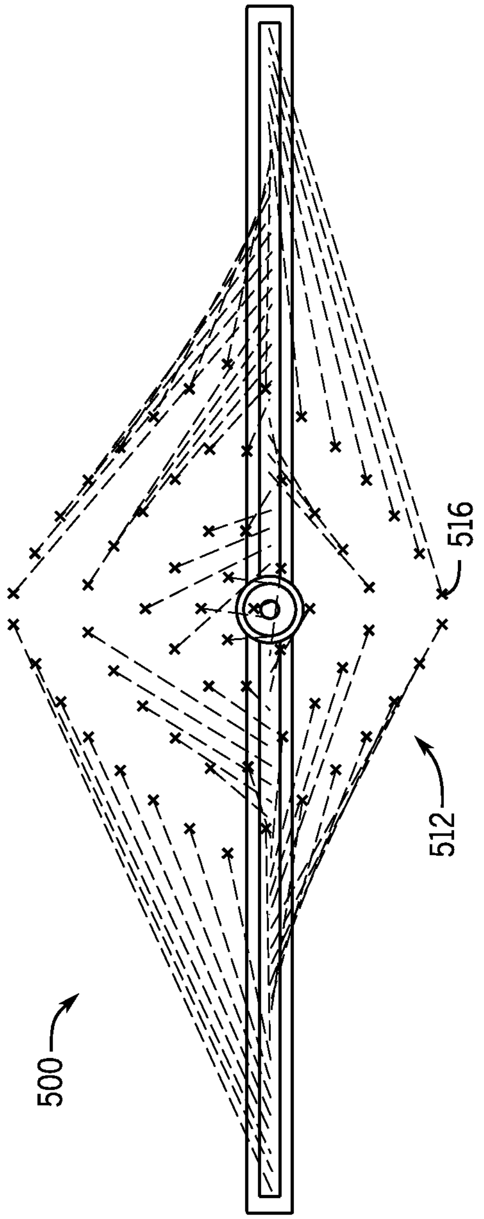
FIG. 11 is a plan view of a spray pattern shape for a spray head assembly, according to another exemplary embodiment.
Figure 12:
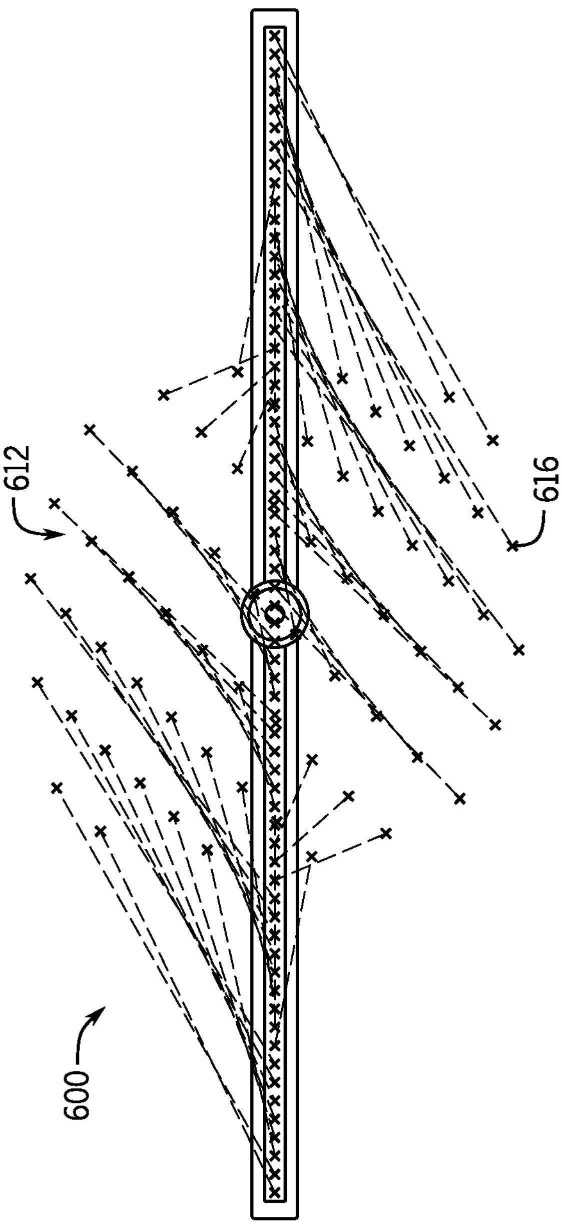
FIG. 12 is a plan view of a spray pattern shape for a spray head assembly, according to another exemplary embodiment.
Figure 13:
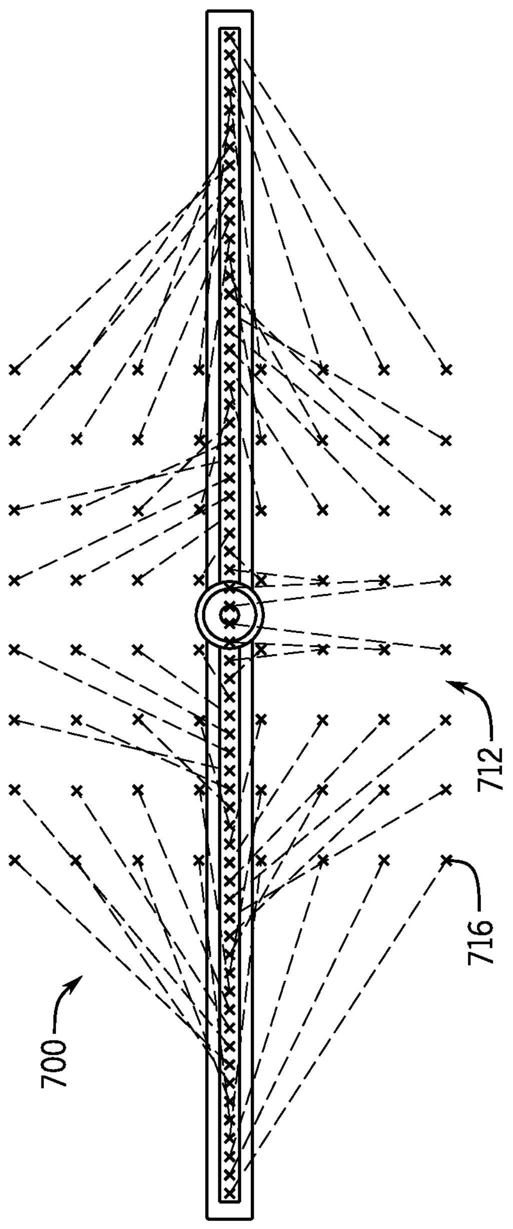
FIG. 13 is a plan view of a spray pattern shape for a spray head assembly, according to another exemplary embodiment.

The number and/or orientation of nozzles along the forward surface (or alternatively, within the body) may be varied from that shown in any of the exemplary embodiments disclosed herein, such as to produce a spray pattern and/or a spray arrangement at a focal length that is different from those spray patterns and arrangements disclosed herein. For example, FIG. 10 shows an exemplary embodiment of a spray head assembly 400 that is configured to produce a rectangular-shaped spray pattern 412 across a two-dimensional distributed area 416. As shown in FIG. 10, the spray pattern 412 is also tilted (e.g., rotated) about a central axis of the forward surface 410 such that the spray pattern 412 is not aligned with the body 402. In the exemplary embodiment of FIG. 11, a spray head assembly 500 is shown that produces a diamond-shaped spray pattern 512. The spray pattern 512 is skewed toward an upper side of the spray head assembly 500 when viewed normal to a reference plane that passes through the distribution area 516, which advantageously provides coverage to areas that aren't in direct alignment with the forward surface of the spray head assembly. FIG. 12 shows an exemplary embodiment of a spray head assembly 600 configured to produce a circular or semi-circular (e.g., elliptical, bullseye/target-shaped, etc.) spray pattern 612 across a distributed area 616. FIG. 13 shows an exemplary embodiment of a spray head assembly 700 configured to produce a square spray pattern 712 across a distributed area 716. In the exemplary embodiments of FIGS. 12-13, the spray patterns are approximately centered with respect to the spray head assembly (e.g., the forward surface) when viewed normal to a reference plane that passes through the distributed area. In other embodiments, the spray patterns may be skewed toward one of the spray head assembly.

The spray head assembly, of which various exemplary embodiments are disclosed herein, provides several advantages over existing devices. The spray head assembly includes a body having a fluid inlet that is configured to receive a supply of water. The spray head assembly also includes a plurality of nozzles arranged in a row across a surface of the body in a substantially linear arrangement across the surface. The nozzles are configured to deliver water from the supply into a shower enclosure in a spray pattern having a non-linear spray pattern shape (e.g., a spray pattern over a two-dimensional distributed area). Among other benefits, the linear arrangement of nozzles allows the spray head assembly to be inconspicuously positioned within a shower enclosure, thereby improving the overall aesthetic of the shower enclosure. Moreover, because the spray head assembly can be positioned along and/or partially within a wall, the available space within the shower enclosure (to which water may be provided) is also maximized. The nozzles are positioned in different directions to distribute flow uniformly across a two-dimensional distributed area within the shower enclosure that is spaced apart from the spray head assembly. Redirecting the flow of water from a linear arrangement to a non-linear arrangement improves the overall coverage that can be provided to a user by the fixed set of nozzles. In some exemplary embodiments, the body additionally includes a flow distribution manifold configured to ensure the flow is distributed uniformly between different nozzles so that a user may receive an equal amount of water from each of the nozzles (e.g., to ensure a consistent flow intensity is provided by the nozzles across the distributed area).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the apparatus and system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A spray head assembly comprising:

a body configured to receive a supply of fluid; and a at least three nozzles disposed on the body and fluidly connected to the body, the at least three nozzles arranged in a substantially linear arrangement across the body, each one of the at least three nozzles oriented to direct fluid in a flow stream to a different location across a distributed area without intersecting the flow stream produced by another one of the at least three nozzles, the at least three nozzles oriented to produce a two-dimensional spray pattern across a reference plane oriented substantially perpendicular to the flow stream of each one of the at least three nozzles.

2. The spray head assembly of claim 1, wherein the at least three nozzles are configured to vary a focal length at which the two-dimensional spray pattern is produced.

3. The spray head assembly of claim 1, wherein the at least three nozzles are arranged in a linear row, at least one of the at least three nozzles angled in both a first direction that is parallel to the linear row and a second direction that is perpendicular to the linear row.

4. The spray head assembly of claim 1, wherein the at least three nozzles together produce the two-dimensional spray pattern over the distributed area at a focal length from the body.

5. The spray head assembly of claim 1, wherein the at least three nozzles are arranged to produce one of a rectangular-shaped spray pattern, a circular spray pattern, or a diamond-shaped spray pattern.

6. The spray head assembly of claim 1, wherein the at least three nozzles are positioned to skew the two-dimensional spray pattern toward one side of the body.

7. The spray head assembly of claim 1, wherein the at least three nozzles is arranged in a rectangular array on the body, the two-dimensional spray pattern being a circular spray pattern.

8. The spray head assembly of claim 1, wherein the at least three nozzles are together arranged to produce a plurality of fluid streams that are spaced at approximately equal intervals across the distributed area at a focal length from the body.

* * * * *